US012608922B2

(12) United States Patent
Hwang et al.

(10) Patent No.: US 12,608,922 B2
(45) Date of Patent: Apr. 21, 2026

(54) METHOD AND APPARATUS FOR ADVERSARIAL SELF-SUPERVISED LEARNING USING TARGET IMAGE, AND COMPUTER-READABLE STORAGE MEDIUM STORING INSTRUCTIONS TO PERFORM METHOD FOR ADVERSARIAL META-LEARNING

(71) Applicant: Korea Advanced Institute of Science and Technology, Daejeon (KR)

(72) Inventors: Sung Ju Hwang, Daejeon (KR); Minseon Kim, Daejeon (KR); Hyeonjeong Ha, Daejeon (KR); Sooel Son, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 285 days.

(21) Appl. No.: 18/485,377

(22) Filed: Oct. 12, 2023

(65) Prior Publication Data

US 2024/0412488 A1 Dec. 12, 2024

(30) Foreign Application Priority Data

Dec. 16, 2022 (KR) ........................ 10-2022-0177545
Jun. 9, 2023 (KR) ........................ 10-2023-0074449

(51) Int. Cl.
*G06V 10/774* (2022.01)
*G06F 16/532* (2019.01)
*G06V 10/74* (2022.01)
*G06V 10/764* (2022.01)

(52) U.S. Cl.
CPC .......... *G06V 10/774* (2022.01); *G06F 16/532* (2019.01); *G06V 10/761* (2022.01); *G06V 10/764* (2022.01)

(58) Field of Classification Search
CPC .. G06V 10/774; G06V 10/761; G06V 10/764; G06V 10/82; G06F 16/532; G06N 3/094; G06N 3/0455; G06N 3/0895
See application file for complete search history.

(56) References Cited

U.S. PATENT DOCUMENTS

| | | | | | |
|---|---|---|---|---|---|
| 11,429,868 | B2 * | 8/2022 | Beggel | ................. | G06N 3/0455 |
| 12,182,721 | B2 * | 12/2024 | Hoshen | ............... | G06F 18/2433 |
| 2021/0042580 | A1 * | 2/2021 | Chen | ......................... | G06N 3/08 |
| 2021/0117771 | A1 * | 4/2021 | Chen | ......................... | G06N 3/08 |
| 2021/0157911 | A1 * | 5/2021 | Yu | ............................. | G06N 3/08 |
| 2022/0198790 | A1 * | 6/2022 | Li | ............................ | G06V 10/28 |
| 2023/0206029 | A1 * | 6/2023 | Qiao | ...................... | G06N 3/045 |
| | | | | | 706/25 |
| 2023/0267337 | A1 * | 8/2023 | Esmaeilzadeh | ........ | G06N 3/047 |
| | | | | | 706/15 |

* cited by examiner

*Primary Examiner* — John B Strege
(74) *Attorney, Agent, or Firm* — NKL LAW; Jae Youn Kim

(57) ABSTRACT

In accordance with an aspect of the present disclosure, there is provided an adversarial self-supervised learning method for an encoder. The method comprises selecting a target image of an original image for training from an image group included in a previously collected dataset; generating a noise image by combining the original image for training with noise using the original image for training and the target image; and training the encoder using the noise image and the original image for training.

15 Claims, 7 Drawing Sheets

QUERY IMAGE ⟶ ENCODER ⟶ CLASSIFICATION RESULT

START

SELECT TARGET IMAGE OF ORIGINAL IMAGE FOR
TRAINING FROM IMAGE GROUP INCLUDED IN
PREVIOUSLY COLLECTED DATASET ~S700

GENERATE NOISE IMAGE BY COMBINING ORIGINAL
IMAGE FOR TRAINING WITH NOISE USING ORIGINAL IMAGE
FOR TRAINING AND TARGET IMAGE ~S710

TRAIN ENCODER USING NOISE IMAGE AND
ORIGINAL IMAGE FOR TRAINING ~S720

END

METHOD AND APPARATUS FOR ADVERSARIAL SELF-SUPERVISED LEARNING USING TARGET IMAGE, AND COMPUTER-READABLE STORAGE MEDIUM STORING INSTRUCTIONS TO PERFORM METHOD FOR ADVERSARIAL META-LEARNING

TECHNICAL FIELD

The present disclosure relates to an adversarial self-supervised learning method and apparatus using a target image.

This work was supported by Institute of Information & communications Technology Planning & Evaluation (IITP) grant funded by the Korea government (MSIT) (Project unique No.: 1711152442; Project No.: 2020-0-00153-003; Government department: Ministry of Science and ICT; R&D management Agency: Institute of Information & communications Technology Planning & Evaluation; and Research Project Title: Development of automatic detection and defense techniques for machine learning model security vulnerabilities).

BACKGROUND

Deep learning models, despite their high performance, react sensitively to very small amounts of noise and thus sometimes fail to produce original performance, which is referred to as a vulnerability of deep learning models.

Deep learning models are particularly vulnerable to adversarial attacks, and an adversarial attack updates a gradient using a loss function set in a direction in which prediction of a deep learning model is most incorrect. If noise is generated in this way and added to the original image, the deep learning model completely loses its performance due to the noise although the noise is not recognized by the human eye, and the prediction performance becomes 0%.

In order to create a deep learning model that is not damaged even by adversarial attacks, an adversarial learning method has been proposed. This is a learning method in which a deep learning model is trained with images generated using adversarial attacks rather than being trained using clean images during a learning process. That is, in order to cope with adversarial attacks, noise is generated in a direction in which a loss function is incorrect during learning, and then images to which the noise has been added are reused for learning to train the deep learning model to lower the loss function.

Meanwhile, unsupervised adversarial learning is attracting attention as a means for securing the robustness of a model without label information. Previous studies on unsupervised adversarial learning have mostly focused on implementing self-supervised learning models which generate adversarial examples by maximizing self-supervised learning loss for each image.

However, simply maximizing self-supervised learning loss without any target example may generate inefficient adversarial examples and thus may not aid in improving the robustness of a trained model. In the case of a non-contrast self-supervised learning model in which negative pairs are not present, in particular, there is a problem in that more inefficient adversarial examples are generated, which lowers the accuracy of the model.

SUMMARY

In view of the above, an object of the present disclosure is to provide a method of training an encoder such that the encoder is robust against adversarial attacks using a target image.

However, the object of the present disclosure is not limited to that mentioned above, and other objects that are not mentioned can be clearly understood by those skilled in the art from the description below.

In accordance with an aspect of the present disclosure, there is provided an adversarial self-supervised learning method for an encoder, the method comprises: selecting a target image of an original image for training from an image group included in a previously collected dataset; generating a noise image by combining the original image for training with noise using the original image for training and the target image; and training the encoder using the noise image and the original image for training.

The selecting of the target image may include selecting an image similar to the original image for training and causing confusion from the image group as the target image.

The selecting of the target image may include selecting the target image from the image group based on a similarity between the original image for training and each of a plurality of images included in the image group and an entropy of each of the plurality of images.

The generating of the noise image may include: generating a first vector by inputting the original image for training to the encoder; generating a second vector by inputting the target image to the encoder; generating noise for the original image for training based on a first loss function set such that a difference between the first vector and the second vector increases; and generating the noise image using the original image for training and the noise.

The training of the encoder may include: transforming the original image for training into a transformed image using a predetermined transformation method; generating a third vector by inputting the original image for training to the encoder; generating a fourth vector by inputting the transformed image to the encoder; generating a fifth vector by inputting the noise image to the encoder; and training the encoder using a second loss function set such that differences between the third vector, the fourth vector, and the fifth vector decrease.

The transformation method may include at least one of cropping, stretching, rotation, color change, or inversion.

The encoder may be used to classify a query image as one of predetermined classes when the query image is obtained.

In accordance with another aspect of the present disclosure, there is provided an adversarial self-supervised learning apparatus, the apparatus comprises: a memory in which an adversarial self-supervised learning program for training an encoder is stored; and a processor configured to control the memory, wherein the processor is configured to: select a target image of an original image for training from an image group included in a previously collected dataset; generate a noise image by combining the original image for training with noise using the original image for training and the target image; and train the encoder using the noise image and the original image for training.

The processor may select the target image from the image group based on a similarity between the original image for training and each of a plurality of images included in the image group and an entropy of each of the plurality of images.

The processor may generate a first vector by inputting the original image for training to the encoder; generate a second vector by inputting the target image to the encoder; generate noise for the original image for training based on a first loss function set such that a difference between the first vector and the second vector increases; and generate the noise image using the original image for training and the noise.

The processor may transform the original image for training into a transformed image using a predetermined transformation method; generate a third vector by inputting the original image for training to the encoder; generate a fourth vector by inputting the transformed image to the encoder; generate a fifth vector by inputting the noise image to the encoder; and train the encoder using a second loss function set such that differences between the third vector, the fourth vector, and the fifth vector decrease.

In accordance with another aspect of the present disclosure, there is provided a non-transitory computer-readable recording medium storing a computer program, which comprises instructions for a processor to perform an adversarial self-supervised learning method for an encoder, the method comprise: selecting a target image of an original image for training from an image group included in a previously collected dataset; generating a noise image by combining the original image for training with noise using the original image for training and the target image; and training the encoder using the noise image and the original image for training.

The selecting of the target image may include selecting an image similar to the original image for training and causing confusion from the image group as the target image.

The selecting of the target image may include selecting the target image from the image group based on a similarity between the original image for training and each of a plurality of images included in the image group and an entropy of each of the plurality of images.

The generating of the noise image may include: generating a first vector by inputting the original image for training to the encoder; generating a second vector by inputting the target image to the encoder; generating noise for the original image for training based on a first loss function set such that a difference between the first vector and the second vector increases; and generating the noise image using the original image for training and the noise.

The training of the encoder may include: transforming the original image for training into a transformed image using a predetermined transformation method; generating a third vector by inputting the original image for training to the encoder; generating a fourth vector by inputting the transformed image to the encoder; generating a fifth vector by inputting the noise image to the encoder; and training the encoder using a second loss function set such that differences between the third vector, the fourth vector, and the fifth vector decrease.

The transformation method may include at least one of cropping, stretching, rotation, color change, or inversion.

The encoder may be used to extract a feature of a query image when the query image is obtained.

According to an embodiment, it is possible to improve the accuracy of an encoder against adversarial attacks by selecting a target image that is similar to an original image for training and causes confusion and generating a noise image for adversarial attacks using the target image.

4

Figure 2:
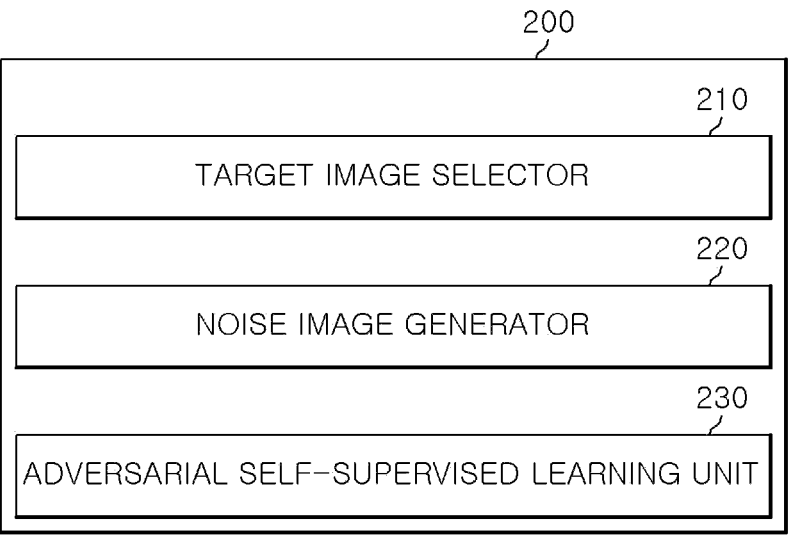

FIG. 2 is a block diagram conceptually illustrating functions of an adversarial self-supervised learning program according to an embodiment.

Figure 3:
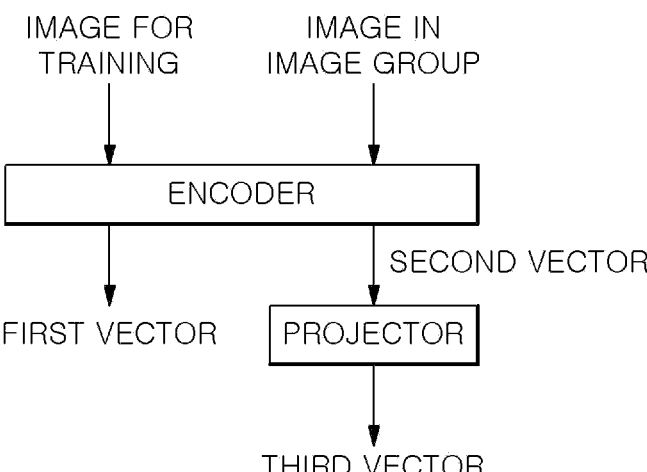

FIG. 3 is a block diagram for describing the function of a target image selector.

Figure 4:
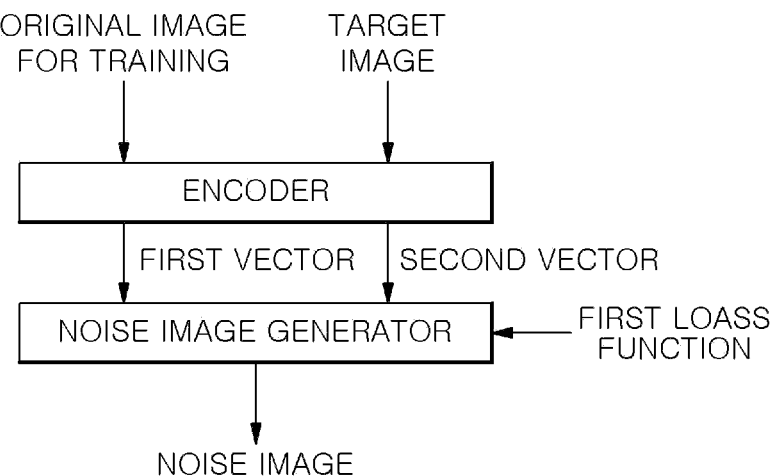

FIG. 4 is a block diagram for describing the function of a noise image generator.

Figure 5:
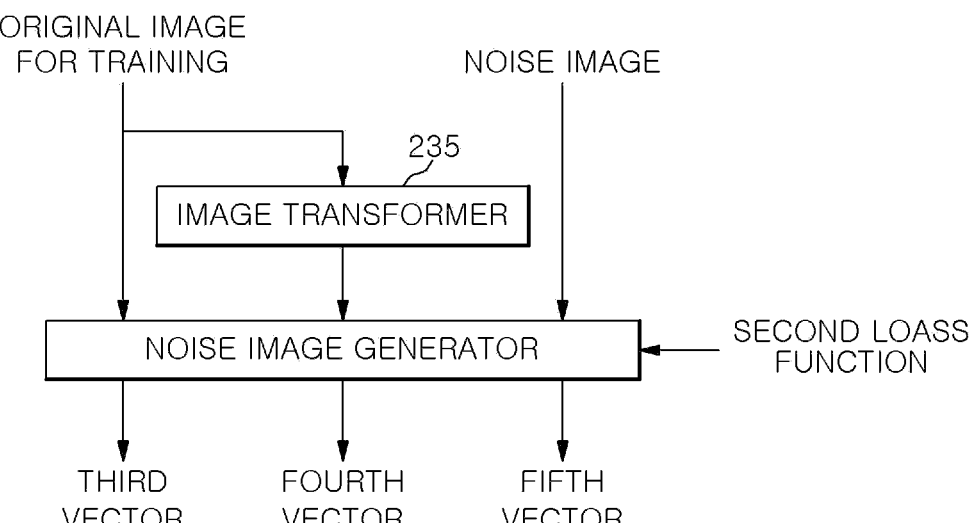

FIG. 5 is a block diagram for describing the function of a self-supervised learning unit.

Figure 6:
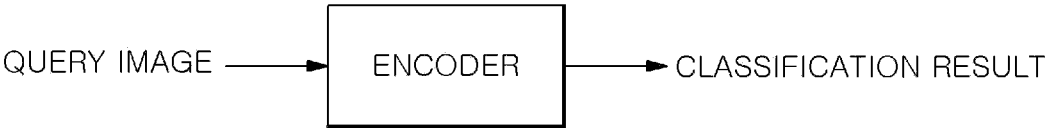

FIG. 6 is a block diagram illustrating a method of classifying a query image using a trained encoder according to an embodiment.

Figure 7:
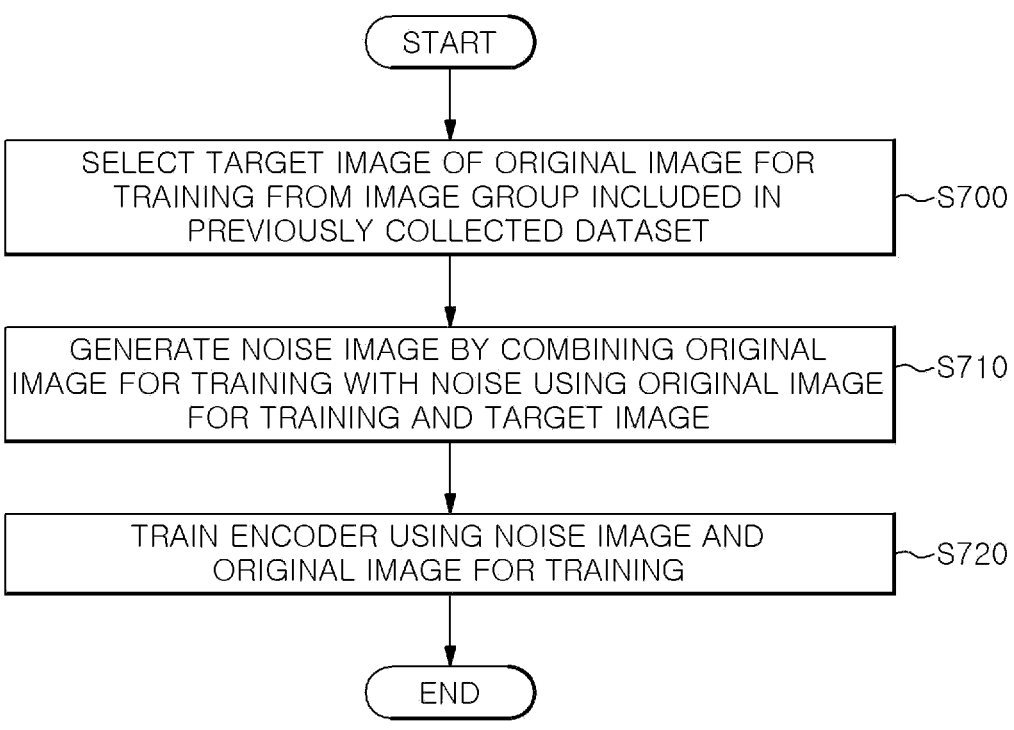

FIG. 7 is a flowchart illustrating a method of training an encoder by an adversarial self-supervised learning program according to an embodiment.

DETAILED DESCRIPTION

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

Figure 1:
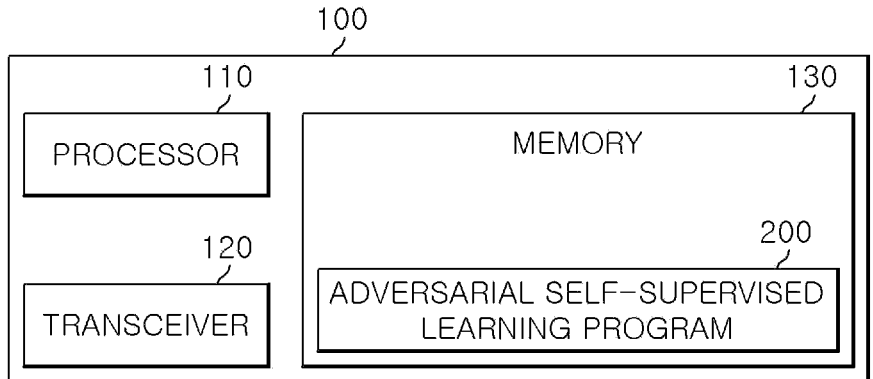
FIG. 1 is a block diagram illustrating an adversarial self-supervised learning apparatus according to an embodiment.

FIG. 1 is a block diagram illustrating an adversarial self-supervised learning apparatus according to an embodiment.

Referring to FIG. 1, the adversarial self-supervised learning apparatus 100 may include a processor 110 and a memory 120.

The processor 110 may control the overall operation of the adversarial self-supervised learning apparatus 100.

The memory 120 may store an adversarial self-supervised learning program 200 and information necessary to execute the adversarial self-supervised learning program 200.

In this specification, the adversarial self-supervised learning program 200 may mean software including instructions programmed to train an encoder corresponding to a deep learning model in a self-supervised manner such that the encoder becomes robust against adversarial attacks.

The processor 110 may load the adversarial self-supervised learning program 200 and the information necessary to execute the adversarial self-supervised learning program 200 from the memory 120 in order to execute the adversarial self-supervised learning program 200.

The processor 110 may train an encoder by executing the adversarial self-supervised learning program 200.

Functions and/or operation of the adversarial self-supervised learning program 200 will be described in detail with reference to FIG. 2.

FIG. 2 is a block diagram conceptually illustrating the functions of the adversarial self-supervised learning program according to an embodiment, FIG. 3 is a block diagram for describing the function of a target image selector, FIG. 4 is a block diagram for describing the function of a noise image generator, and FIG. 5 is a block diagram for describing the function of a self-supervised learning unit.

Referring to FIG. 2, the adversarial self-supervised learning program 200 may include a target image selector 210, a noise image generator 220, and a self-supervised learning unit 230.

Upon acquisition of an original image for training, the target image selector may select a target image of the original image for training from among image groups included in a previously collected dataset.

According to the embodiment, the target image selector 210 may randomly select a predetermined number (e.g., a batch size) of images from the dataset as an image group, and if any one image from the image group is selected as an original image for training, select one of the remaining images in the image group other than the original image for training as a target image of the original image for training.

More specifically, the target image selector 210 may select an image that is similar to the original image for training and causes confusion from the image group as the target image.

Referring to FIG. 3, the target image selector 210 may select a target image of an original image for training from an image group based on formula 1 below according to an embodiment.

$$S\big(T_1(x)_i,\, T_2(x)_j\big) = \frac{e_i}{\|e_i\|} \cdot \frac{e_j}{\|e_j\|} + \Big(\frac{p_j}{\tau}\Big)\log\Big(\frac{p_j}{\tau}\Big) \qquad \text{[Formula 1]}$$

Here, $T_1(x)_i$ represents an original image for training, $T_2(x)_j$ represents a certain image other than the original image for training in an image group, $e_i$ represents a first vector obtained by inputting the original image for training to an encoder, $e_j$ denotes a second vector obtained by inputting the certain image to the encoder, $p_j$ denotes a third vector obtained by reducing the dimension of the second vector by inputting the second vector to a projector, and $\tau$ is a constant (e.g., a positive real number).

In Formula 1, the first term on the right side may represent the similarity between the first vector and the second vector, and the second term on the right side may represent the entropy of the certain image.

Therefore, according to Formula 1, the target image selector 210 may select an image having a high similarity to the original image for training and a high entropy from the image group as a target image of the original image for training.

The noise image generator 220 may generate a noise image by combining the original image for training with noise using the original image for training and the target image.

Referring to FIG. 4, according to the embodiment, in a case in which the encoder generates the first vector by receiving the original image for training and generates the second vector by receiving the target image, the noise image generator 220 may receive the first vector and the second vector, set a first loss function such that a difference between the first vector and the second vector increases, generate noise for the original image for training (e.g., noise for adversarial attacks) based on the first loss function, and generate a noise image using the original image for training and the noise.

The self-supervised learning unit 230 may train the encoder using the noise image generated by the noise image generator 220 and the original image for training.

Referring to FIG. 5, according to an embodiment, the self-supervised learning unit 230 may include an image transformer 235, and the image transformer 235 may transform the original image for training to generate a transformed image.

The image transformer 235 may transform the original image for training into a transformed image using a predetermined transformation method. According to the embodiment, the transformation method may include at least one of cropping, stretching, rotation, color change, or inversion. For example, the image transformer 235 may generate a transformed image by cropping a predetermined region from the original image for training or may generate a transformed image by rotating the original image for training by 90 degrees.

The self-supervised learning unit 230 may generate a third vector by inputting the original image for training to the encoder (i.e., the encoder generates the third vector by encoding the original image for training), generate a fourth vector by inputting the transformed image to the encoder (i.e., the encoder generates the fourth vector by encoding the transformed image), generate a fifth vector by inputting a noise image to the encoder (i.e., the encoder generates the fifth vector by encoding the noise image), and train the encoder by additionally inputting a second loss function set such that differences between the third vector, the fourth vector, and the fifth vector decrease to the encoder.

Although FIG. 5 illustrates that the self-supervised learning unit 230 includes the image transformer 235, the present disclosure is not limited thereto. That is, according to the embodiment, in a case in which the image transformer 235 is not included in the self-supervised learning unit 230, the self-supervised learning unit 230 may generate the third vector by inputting the original image for training to the encoder, generate the fifth vector by inputting the noise image to the encoder, and train the encoder by additionally inputting a third loss function set such that a difference between the third vector and the fifth vector decreases to the encoder.

FIG. 6 is a block diagram illustrating a method of classifying a query image using a trained encoder according to an embodiment.

Referring to FIGS. 2 to 6, the encoder may correspond to a deep learning model that has been trained by the adversarial self-supervised learning program 200.

Upon acquisition of a query image, the encoder may extract a feature vector of the query image or classify the query image as one of predetermined classes.

Although the encoder may be executed in the adversarial self-supervised learning apparatus 100 to generate a vector for a query image or to classify the query image as one of predetermined classes according to the embodiment, the encoder may be executed in an apparatus other than the adversarial self-supervised learning apparatus 100 to generate a vector for a query image or to classify the query image as one of predetermined classes.

FIG. 7 is a flowchart illustrating a method of training an encoder by the adversarial self-supervised learning program according to an embodiment.

Referring to FIGS. 2 to 5 and 7, the target image selector 210 may select a target image of an original image for training from among image groups included in a previously collected dataset (S700).

The noise image generator 220 may generate a noise image by combining the original image for training with noise using the original image for training and the target image (S710).

The self-supervised learning unit 230 may train the encoder using the noise image and the original image for training (S720).

According to an embodiment, it is possible to improve the accuracy of an encoder against adversarial attacks by selecting a target image that is similar to an original image for training and causes confusion and generating a noise image for adversarial attacks using the target image.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. An adversarial self-supervised learning method for training an encoder, the method being performed by one or more processors executing instructions stored in a computer memory, the method comprising:

selecting a target image of an original image for training from an image group included in a previously collected dataset;

generating a noise image by combining the original image for training with noise using the original image for training and the target image; and training the encoder using the noise image and the original image for training, wherein the selecting of the target image includes selecting the target image from the image group based on a similarity between the original image for training and each of a plurality of images included in the image group and an entropy of each of the plurality of images.

2. The adversarial self-supervised learning method of claim 1, wherein the selecting of the target image includes selecting an image similar to the original image for training the encoder.

3. The adversarial self-supervised learning method of claim 1, wherein the generating of the noise image includes:

generating a first vector by inputting the original image for training to the encoder;

generating a second vector by inputting the target image to the encoder;

generating noise for the original image for training based on a first loss function set such that a difference between the first vector and the second vector increases; and generating the noise image using the original image for training and the noise.

4. The adversarial self-supervised learning method of claim 1, wherein the training of the encoder includes:

transforming the original image for training into a transformed image using a transformation method;

generating a third vector by inputting the original image for training to the encoder;

generating a fourth vector by inputting the transformed image to the encoder;

generating a fifth vector by inputting the noise image to the encoder; and training the encoder using a second loss function set such that differences between the third vector, the fourth vector, and the fifth vector decrease.

5. The adversarial self-supervised learning method of claim 4, wherein the transformation method includes at least one of cropping, stretching, rotation, color change, or inversion.

6. The adversarial self-supervised learning method of claim 1, wherein the encoder is used to classify a query image as one of classes when the query image is obtained.

7. An adversarial self-supervised learning apparatus, comprising:

a memory in which an adversarial self-supervised learning program for training an encoder is stored; and a processor configured to control the memory, wherein the processor, when the adversarial self-supervised learning program is executed, is configured to:

select a target image of an original image for training from an image group included in a previously collected dataset;

generate a noise image by combining the original image for training with noise using the original image for training and the target image; and train the encoder using the noise image and the original image for training, wherein the processor is configured to select the target image from the image group based on a similarity between the original image for training and each of a plurality of images included in the image group and an entropy of each of the plurality of images.

8. The adversarial self-supervised learning apparatus of claim 7, wherein the processor is configured to:

generate a first vector by inputting the original image for training to the encoder;

generate a second vector by inputting the target image to the encoder;

generate noise for the original image for training based on a first loss function set such that a difference between the first vector and the second vector increases; and generate the noise image using the original image for training and the noise.

9. The adversarial self-supervised learning apparatus of claim 8, wherein the processor is configured to:

transform the original image for training into a transformed image using a transformation method;

generate a third vector by inputting the original image for training to the encoder;

generate a fourth vector by inputting the transformed image to the encoder;

generate a fifth vector by inputting the noise image to the encoder; and train the encoder using a second loss function set such that differences between the third vector, the fourth vector, and the fifth vector decrease.

10. A non-transitory computer readable storage medium including computer executable instructions, wherein the instructions, when executed by a processor, cause the processor to perform an adversarial self-supervised learning method for an encoder, the method comprising:

selecting a target image of an original image for training from an image group included in a previously collected dataset;

generating a noise image by combining the original image for training with noise using the original image for training and the target image; and training the encoder using the noise image and the original image for training, wherein the selecting of the target image includes selecting the target image from the image group based on a similarity between the original image for training and each of a plurality of images included in the image group and an entropy of each of the plurality of images.

11. The non-transitory computer readable storage medium of claim 10, wherein the selecting of the target image includes selecting an image similar to the original image for training the encoder.

12. The non-transitory computer readable storage medium of claim 10, wherein the generating of the noise image includes:

generating a first vector by inputting the original image for training to the encoder;

generating a second vector by inputting the target image to the encoder;

generating noise for the original image for training based on a first loss function set such that a difference between the first vector and the second vector increases; and generating the noise image using the original image for training and the noise.

13. The non-transitory computer readable storage medium of claim 10, wherein the training of the encoder includes:

transforming the original image for training into a transformed image using a transformation method;

generating a third vector by inputting the original image for training to the encoder;

generating a fourth vector by inputting the transformed image to the encoder;

generating a fifth vector by inputting the noise image to the encoder; and training the encoder using a second loss function set such that differences between the third vector, the fourth vector, and the fifth vector decrease.

14. The non-transitory computer readable storage medium of claim 13, wherein the transformation method includes at least one of cropping, stretching, rotation, color change, or inversion.

15. The non-transitory computer readable storage medium of claim 10, wherein the encoder is used to classify a query image as one of classes when the query image is obtained.

* * * * *